United States Patent [19]

Bluestein

[11] 4,304,897

[45] Dec. 8, 1981

[54] ROOM TEMPERATURE VULCANIZABLE SILICONE RUBBER COMPOSITIONS AND PROCESS OF MAKING

[75] Inventor: Ben A. Bluestein, Schenectady, N.Y.

[73] Assignee: General Electric Company, Waterford, N.Y.

[21] Appl. No.: 169,561

[22] Filed: Jul. 17, 1980

[51] Int. Cl.³ .................... C08G 77/16; C08L 83/06; C08L 83/12
[52] U.S. Cl. .................................. 528/20; 525/477; 528/33; 528/34
[58] Field of Search .................. 525/477; 528/24, 33, 528/34, 20

[56] References Cited

U.S. PATENT DOCUMENTS

| | | | |
|---|---|---|---|
| 3,133,891 | 5/1964 | Ceyzeriat | 260/18 |
| 3,342,766 | 9/1967 | Huntington | 260/29.6 |
| 3,629,165 | 12/1971 | Holdstock | 260/17 T N |
| 3,792,008 | 2/1974 | Neuroth | 260/30.6 S B |
| 4,100,129 | 7/1978 | Beers | 528/14 |
| 4,144,206 | 3/1979 | Symeon | 528/24 |

*Primary Examiner*—Wilbert J. Briggs, Sr.

[57] ABSTRACT

A one-component room temperature vulcanizable silicone rubber composition having improved flow characteristics and process for preparing cured silicone rubbers derived therefrom. The one-component silicone rubber compositions consist of a silanol end-stopped linear diorganopolysiloxane base polymer, a filler, an organotriacyloxysilane cross-linker, a catalyst and an organopolysiloxane copolymer consisting of a polysiloxane chain and a polyether chain which are linked together through various carboxyl alkyl radicals. This final component accounts for the improvement in the flow properties of the one-component silicone rubber compositions. In a process for preparing a cured one-component silicone rubber composition, the polysiloxane polyether copolymer is mixed with the diorganopolysiloxane base polymer after which the cross-linker is added and the final mixture exposed to moisture for curing.

35 Claims, No Drawings

ROOM TEMPERATURE VULCANIZABLE SILICONE RUBBER COMPOSITIONS AND PROCESS OF MAKING

This invention relates to room temperature vulcanizable silicone rubber compositions and, more particularly, to acetoxy-curing one-component room temperature vulcanizable silicone rubber compositions having improved flow characteristics and process for making the same.

BACKGROUND OF THE INVENTION

One-component room temperature vulcanizable (RTV) silicone rubber compositions are well known in the art. Examples of such compositions are described in U.S. Pat. Nos. 3,035,016, 3,133,891 and 3,296,161. Such one-component room temperature vulcanizable silicone rubber compositions generally consist of a silanol endstopped linear diorganopolysiloxane polymer, a filler, an organotriacyloxysilane as a cross-linking agent and a metal salt of a carboxylic acid as a catalyst. The one-component compositions cure to a solid, elastic state at room temperature upon exposure to moisture commonly present in the atmosphere.

One-component room temperature vulcanizable silicone rubbers of these types are extremely useful and are particularly adapted for caulking and sealing applications where strong adhesion to various surfaces is important. In the preparation of the one-component room temperature vulcanizable silicone rubber compositions, it has been observed that in certain instances, the addition of the cross-linking agent to the silanol endstopped linear diorganopolysiloxane results in a compound which has an abnormally high flow rate and which losses its thixotropic characteristics. The high flow rate increases the difficulty of applying the silicone rubber compositions to various surface areas, especially vertical surfaces, with any accuracy. The silicone rubber compositions possessing a high flow rate, have a tendency to spread from and flow out of the particular area to which they are applied resulting in a decrease in the effectiveness of such compositions for their intended purpose.

One method of lowering the flow rate of one-component room temperature vulcanizable silicone rubber compositions has involved the addition of a treated fumed silica filler alone, or in conjunction with a phenyl-containing polysiloxane fluid with high trifunctionality as disclosed in U.S. Pat. No. 4,000,129. In U.S. Pat. No. 4,000,129 at least 11 to 14 parts of such additives are incorporated into one-component room temperature vulcanizing systems per 100 parts of the base silanol endstopped diorganopolysiloxane polymer. While such additives are effective, the presence of the fumed silica, whether treated or untreated has a tendency to increase the modulus of elasticity of the cured silicone rubber formed from the composition. However, it is highly desirable to have room temperature vulcanizable silicone rubber compositions with as low a modulus of elasticity as possible, especially when such compounds are used as sealants. The lower the modulus of elasticity of the uncured rubber, the higher the elasticity of the rubber in the cured state. The elasticity of a cured rubber is a measure of such rubber's ability to absorb structural strain due to the movement of distinct surfaces which have been sealed with such rubber. Accordingly, it is desirable to provide a compound which will improve the flow properties of uncured room temperature vulcanizable silicone rubber compositions without a concurrent increase in the modulus of elasticity of such compounds.

Organopolysiloxane copolymers as disclosed in U.S. Pat. No. 3,629,165 consisting of a polysiloxane chain and a polyether chain which are linked together through various carboxyl alkyl radicals have been used as polyurethane foam additives. Such copolymers have made it possible to produce satisfactory polyurethane foams by a single step process instead of the customary two-step process. They act to give control of pore size and to guide toward closed- or open-cell types of foam. They make bubble formation easier, promote uniform cell size and prevent bubble coalescence. However, such compositions have not been heretofore used for improving the flow characteristics of one-component room temperature vulcanizable silicone rubber compositions or for improving the modulus of elasticity of one-component room temperature vulcanizable silicone rubber compositions.

SUMMARY OF THE INVENTION

An object of the present invention is to provide an improved one-component room temperature vulcanizable silicone rubber composition.

A further object of the invention is to provide a one-component room temperature vulcanizable silicone rubber composition having improved flow properties.

A further object of the invention is to provide a one-component room temperature vulcanizable silicone rubber composition having improved flow properties without increasing the modulus of elasticity of the cured silicone rubber.

Still a further object of the invention is to provide a process for producing a cured one-component room temperature vulcanizable silicone rubber having improved flow properties.

These and other objects of the present invention are accomplished by the provision of one-component room temperature vulcanizable silicone rubber compositions and process for making the same involving the use of a liquid organopolysiloxane copolymer consisting of a polysiloxane chain and a polyether chain which are linked together through various carboxyl alkyl radicals. The carboxy alkyl radicals are attached to the silicon atoms through Si-C bonds. The polysiloxane polyether copolymers of the present invention are generally characterized by the formula:

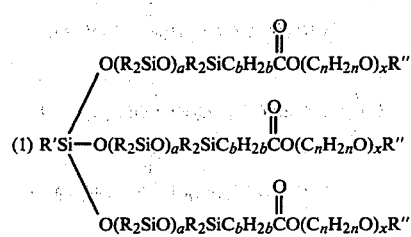

where R, R', R'', a, b, n and x are as defined hereinafter.

The one-component room temperature vulcanizable silicone rubber compositions having improved flow properties are prepared by incorporating a polysiloxane polyether copolymer of Formula (1) into the uncured composition of such rubbers and then curing such compositions to form the silicone rubber.

DETAILED DESCRIPTION OF THE INVENTION

In preferred embodiments of the present invention, there is provided a one-component room temperature vulcanizable silicone rubber composition which has improved flow properties comprising:

(A) a liquid organopolysiloxane having a viscosity of from about 200 to about 500,000 centistokes at 25° C. and containing from about 0.02% to about 2.0% by weight silicon-bonded hydroxyl radicals;

(B) an organotriacyloxysilane cross-linker having the formula:

(2) $R^3Si(OY)_3$ where $R^3$ is a radical selected from the group consisting of monovalent hydrocarbon radicals, halogenated monovalent hydrocarbon radicals, and cyanoalkyl radical and Y is a saturated monoacyl radical of a carboxylic acid;

(C) a filler;

(D) a process aid having a viscosity of up to about 200 centipoises at 25° C. composed of diorganosiloxy units of the formula:

(3) $(R^4)_2SiO$ chemically combined with organosiloxy units of the formula:

(4) $R^4SiO_{1.5}$ and triorganosiloxy units of the formula:

(5) $(R^4)_3SiO_{0.5}$ wherein the process aid contains from about 0.1% to about 8% by weight of hydroxy radicals attached to silicon, and a ratio of organosiloxy units to diorganosiloxy units of from about 0.11 to about 1.4 inclusive, and a ratio of triorganosiloxy units to diorganosiloxy units of from about 0.02 to about 1 inclusive, and where $R^4$ is a radical selected from the group consisting of monovalent hydrocarbon radicals, halogenated monovalent hydrocarbon radicals and cyanoalkyl radicals, preferably being methyl;

(E) a catalyst;

(F) a polysiloxane polyether copolymer having the formula:

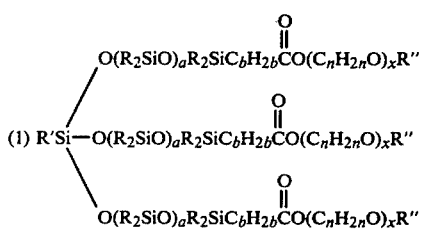

where R and R' are monovalent hydrocarbon radicals; R" is a lower alkyl radical; a has a value of at least 2, e.g., from about 2 to 40 or more; b has a value of from 2 to 3, inclusive; n has a value of from 2 to 4, inclusive; and x has a value of at least 5, e.g., from 5 to 100 or more.

The radicals represented by R and R' in Formula (1) can be, for example, alkyl radicals, such as, methyl, ethyl, propyl, butyl, octyl, radicals; aryl radicals, such as, phenyl, tolyl, napthyl, xylyl, radicals; alkenyl and cycloalkenyl radicals, such as, vinyl, allyl, cyclohexenyl, radicals; and halogenated radicals of the aforementioned type, such as chloromethyl, chlorophenyl, dibromophenyl, radicals. As previously mentioned, the R" group is a lower alkyl radical, such as, an alkyl radical containing from 1 to about 7 carbon atoms, such as methyl, ethyl propyl, butyl, isobutyl, amyl, radicals. In the preferred embodiments, both the R and R' radicals are alkyl or aryl radicals, the most preferred being methyl and phenyl radicals.

The liquid organopolysiloxanes employed in the practice of the present invention are well known in the art and form the "base polymer" for the room temperature vulcanizable silicone rubber compositions of the invention. These base polymers, which can comprise a single specie or a plurality of species, are liquids having a viscosity of from about 200 to about 500,000 centistokes at 25° C., which contain an average of from 1.85 to 2.01 silicon-bonded organic radicals per silicon atom, with the organic radicals being selected from the group consisting of monovalent hydrocarbon radicals, halogenated monovalent hydrocarbon radicals and cyanoalkyl radicals, with the organic radicals being attached to silicon through silicon-carbon linkages and with there being present in the base polymer from about 0.02% to about 2.0% by weight silicon-bonded hydroxyl radicals.

In general, the base polymers comprise primarily diorganosiloxane units with minor amounts of monoorganosiloxane units and triorganosiloxane units. The preferred type of liquid organopolysiloxane base polymer has the formula:

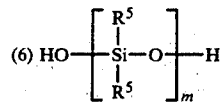

where $R^5$ is a radical selected from the group consisting of monovalent hydrocarbon radicals, halogenated monovalent hydrocarbon radicals and cyanoalkyl radicals, and m has a value of at least 5, e.g., from about 20 to 3,000 or more. The preferred organic radicals represented by $R^5$ are methyl and phenyl. It should be understood that the liquid organopolysiloxane within the scope of Formula (6) can comprise a variety of molecules of different molecular weights and of different $R^5$ substituents so long as the average formula of the reaction mixture falls within the scope of Formula (6).

In addition to the linear silanol chainstopped diorganopolysiloxanes of Formula (6), the base polymer can also contain molecules having linear diorganosiloxane chains which are terminated at one end with triorganosiloxane units having the formula:

(7) $(R^5)_3SiO_{0.5}$ with the other end of the chain being terminated by silanol groups, where $R^5$ is as previously defined. The polymer chains can also contain molecules having mono-organosiloxane units having the formula:

(8) $R^5SiO_{1.5}$ where $R^5$ is as previously defined. In any case, it is necessary that the liquid organopolysiloxane base polymer have a viscosity in the range of from about 200 to about 500,000 centistokes at 25° C. as previously described.

The preparation of the diorganopolysiloxanes of Formula (6) is carried out by any of the procedures well known to those skilled in the art. In one method, one or more hydrocarbon substituted dichlorosilanes are hydrolyzed resulting in a hydrolyzate containing a mixture of linear and cyclic polysiloxanes. The hydrolyzate is then treated with a suitable catalyst to cause a depolymerization resulting in a mixture of low boiling, low molecular weight cyclic polymers. The resulting composition is distilled to obtain a pure product containing the low boiling, low molecular weight cyclic polymers free of any significant amount of monofunctional and trifunctional groups. The pure cyclic polymers are then mixed in desired proportions and subjected to an equilibration procedure to obtain a linear diorganopolysiloxane.

The equilibration is carried out in the presence of a rearrangement catalyst, the amount used being dependent upon the extent of polymerization desired. Water is also present in the reaction mixture to supply the hydroxy groups which function as chainstoppers for the linear diorganopolysiloxane material that is formed. Once the equilibration point is reached, there is added an acid donor to neutralize the catalyst and terminate polymerization. The cyclic diorganosiloxanes in the reaction mixture are then removed by distillation leaving the polydiorganosiloxane polymer which is useful in the present invention.

The organotriacyloxysilane cross-linkers of Formula (2) are also well known in the art. The acyl radical represented by Y is of the scope previously described, with the preferred Y radicals being those containing up to 12 carbon atoms, the most preferred Y radicals being those containing up to 8 carbon atoms, and the preferred specific Y radicals being acetyl. The $R^3$ group of Formula (2) is of the same scope as described for the $R^5$ groups of the liquid organopolysiloxane, but preferably is a lower alkyl radical, such as methyl, ethyl, propyl, butyl, octyl, or is a simple aryl radical, such as phenyl or tolyl. The preferred specific composition within the scope of Formula (2) is methyltriacetoxysilane.

A one-component room temperature vulcanizable silicone rubber composition is prepared by mixing the liquid organopolysiloxane base polymer with the organotriacyloxysilane cross-linker. Since the organotriacyloxysilane cross-linker hydrolyzes upon exposure to the atmosphere, the above mixing must take place under substantially anhydrous conditions. When exposed to atmospheric moisture the composition cures slowly to form a silicone elastomer. The amounts of the organopolysiloxane base polymer and the organotriacyloxysilane cross-linker employed in producing compositions which, upon exposure to moisture, cure to the solid elastomeric state, vary within broad limits. Generally, the amount of organotriacyloxysilane cross-linker of Formula (2) is from about 1.8 to about 6.0 parts by weight per 100 parts of the organopolysiloxane base polymer.

The cure of the organopolysiloxane base polymer-organotriacyloxysilane cross-linker mixture may be accelerated by adding to it a catalyst. To accelerate the cure a minor amount of carboxylic acid salt of a metal ranging from lead to manganese, inclusive, in the electromotive series of metals, can be effectively added to the above-identified mixture. The particular metals included within this scope are lead, tin, nickel, cobalt, iron, cadmium, chromium, zinc and manganese. The specific metal ion which is preferred is tin.

The carboxylic acids from which the salts of the above metals are derived can be monocarboxylic acids or dicarboxylic acids, and the metallic salts can be either soluble or insoluble in the organopolysiloxane. Preferably, the salts employed are soluble in the organopolysiloxane to facilitate the uniform dispersion of the salt in the reaction mixture.

Illustrations of the metal salts which can be employed in the practice of this invention include zinc-naphthenate, lead-naphthenate, cobalt-naphthenate, cobalt-octoate, zinc-octoate, lead-octoate, chromium-octoate, tin-octoate, carbomethoxyphenyl tin trisuberate, isobutyl tin triceroate, cyclohexenyl lead triacotinate, xenyl lead trisalicylate, dimethyl tin dibutyrate, dibutyl tin diacetate, dibutyl tin dilaurate, divinyl tin diacetate, dibutyl tin dibenzoate, dibutyl tin dioctoate, dibutyl tin maleate, dibutyl tin adipate, diisoamyl tin bistrichlorobenzoate, and the like.

The amount of the metal salt of the organic carboxylic acid catalyst can vary depending upon the increase in curing rate desired. In general, no benefit is derived from employing more than about 5 parts by weight of such metal salt per 100 parts of the organopolysiloxane base polymer. Preferably, from about 0.01 to about 2.0 parts by weight of the metal salt, based on the weight of the base polymer should be employed.

The organometallic ester compound of a metal other than silicon, as disclosed and claimed in U.S. Pat. No. 4,100,129, is also a suitable catalyst for accelerating the cure rate of one-component silicone rubber compositions. The organometallic ester compound is a partially chelated ester of a lower aliphatic alcohol with a β-dicarbonyl compound or a partial hydrolyzate of a partially chelated ester of a lower aliphatic alcohol with a β-dicarbonyl compound which retain at least one hydrocarbonoxy radical or substituted hydrocarbonoxy radical attached to the metal atom through M-O-C linkages, where M is a metal. Preferably, the metal will be selected from lead, tin, zirconium, antimony, iron, cadmium, barium, calcium, titanium, bismuth, manganese, zinc, chromium, cobalt, nickel, aluminum, gallium or germanium. Most preferably, the metal is titanium.

When the ortho-ester is used as the catalyst, it is preferred to employ an amount of organometallic ester catalyst which provides a total number of moles of silanol reactive ester linkages which is equal to or greater than the total number of moles of terminal groups in the liquid organopolysiloxane base polymer. The weight ratio of organometallic ester catalyst to the cross-linking agent ranges from 0.5 to 1 to 50 to 1.

The one-component room temperature vulcanizable silicone rubber compositions can also incorporate a process aid which is a silanol-containing organosilicon material composed of chemically combined units of Formula (3), (4) and (5). The process aid is described in U.S. Pat. No. 3,382,205 which is hereby incorporated by reference. The process aid is prepared by hydrolyzing a mixture of a diorganodihalosilane, $R_2^4SiX_2$, an organotrihalosilane, $R^4SiX_3$, and a triorganohalosilane, $R_3^4SiX$, where $R^4$ is the same as previously described, and X is a halogen radical such as chloro. The acid formed during hydrolysis is kept at a concentration below about 32% by weight of acid and preferably in a range of between about 28% to about 32% by weight of acid. If the hydrolysis is accomplished at a pH of about 5 to about 7, by use of buffering agents such as alkali bicarbonates, a process aid can be made having about 8% or more by weight of hydroxy radicals attached to silicon. Preferably, the hydrolysis is performed at a temperature below about 30° C., but a temperature between 20° C. to 40° C. will provide for effective results. Once hydrolysis is completed the process aid is recovered from the acid layer of the hydrolyzate and neutralized with a standard neutralizing agent, such as, an alkali bicarbonate, for example, sodium bicarbonate, ammonia, and the like.

Other forms of the process aid which can be effectively employed in the practice of the present invention include a silanol-containing organosilicone material composed of chemically combined units of Formulae (4) and (5), Formulae (3) and (5), and Formula (3) and (4).

The amount of the process aid which can be employed in the practice of the present invention can range from about 2 to about 30 parts by weight per 100 parts by weight of the base polymer.

The ingredient which improves the flow properties of the above-identified one-component silicone rubber compositions is the polysiloxane polyether copolymer as described in Formula (1). The polysiloxane polyether copolymer and the method for making the same are illustrated in U.S. Pat. No. 3,629,165 which is hereby incorporated by reference.

The organosilicon compounds of Formula (1) can be prepared by the esterification of a liquid carboxyalkyl-containing organopolysiloxane having the formula:

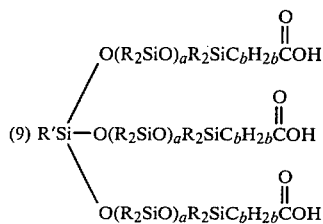

with a liquid polyalkylene glycol monoether having the formula:

(10) HO($C_nH_{2n}O$)$_x$R″ where R, R′, and R″, a, b, n and x are previously defined. The organopolysiloxane of Formula (9) and the polyalkylene glycol monoether of Formula (10) are mixed together in the presence of a suitable inert solvent and a catalyst and heated at the reflux temperature of the catalyst until esterification is effected. Suitable inert solvents include the hydrocarbon solvents, such as, benzene, toluene, xylene, mineral spirits, and the like. The amount of solvent employed is not critical and may vary within extremely wide limits. Satisfactory results have been obtained by using from about 0.5 to about 5 parts of solvent per part of the mixture of the polysiloxane of Formula (9) and the monoether of Formula (10).

One useful catalyst for the esterification reaction is p-toluene sulfonic acid. The amount of catalyst employed is not critical, with satisfactory results being obtained employing from about 0.1% to about 5% by weight of the catalyst based on the weight of the reaction mixture. The reaction is continued until the esterification is complete which, depending upon the reactants, takes from about 2 to about 24 hours or more. After esterification is complete, the catalyst is neutralized with sodium bicarbonate; the solution is then filtered; and the solvent is distilled from the reaction mixture.

In preparing the organopolysiloxane copolymer of Formula (1) through the esterification process, the proportions of the organopolysiloxane of Formula (9) and the polyalkylene glycol monoether of Formula (10) are selected so that three molecules of the monoether of Formula (10) are available for esterification with one molecule of the polysiloxane of Formula (9). By controlling the particular carboxyalkyl-containing organopolysiloxane of Formula (9) and the particular polyalkylene glycol monoether of Formula (10), the relative proportions of the silicone portion and polyoxyalkylene portion of the copolymer of Formula (1) are controlled. Preferably, the silicone portion of the copolymer comprises from about 5% to about 60% of the total weight of the copolymer.

The carboxyalkyl-containing organopolysiloxanes of Formula (9) are described and claimed in U.S. Pat. No. 3,182,076 incorporated herein by reference. These compounds are formed by the hydrolysis and condensation of a mixture of an organotrichlorosilane having the formula:

(11) R′SiCl$_3$ a diorganodichlorosilane having the formula:

(12) R$_2$SiCl$_2$ and a cyanoalkyldiorganochlorosilane having the formula:

(13) R$_2$Si(Cl)C$_b$H$_{2b}$CN where R and R′ are monovalent hydrocarbon radicals; and b has a value of from 2 to 3, inclusive.

The polyalkylene glycol monoethers of Formula (10) are well known in the art. These materials are formed by reacting a monohydric alcohol of the formula R″OH with an alkylene oxide or a mixture of alkylene oxides. The molecular weight of the polyalkylene glycol monoethers can be controlled by controlling the conditions under which the reaction between the monohydric alcohol and the alkylene oxide occurs.

Polysiloxane polyether copolymers which can be employed in the practice of the present invention include a copolymer of the formula:

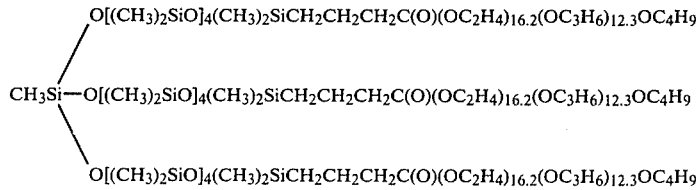

having a viscosity of about 730 centipoises at 25° C.; a copolymer of the formula:

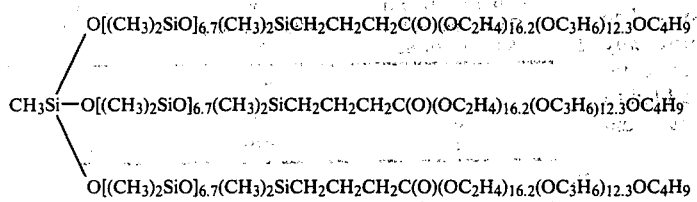

having a viscosity of about 920 centipoises at 25° C.; a copolymer of the formula:

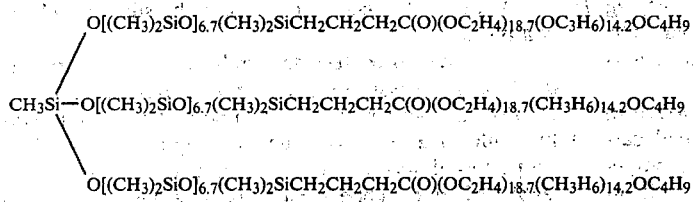

having a viscosity of about 1000 centipoises at 25° C.; and a copolymer of the formula:

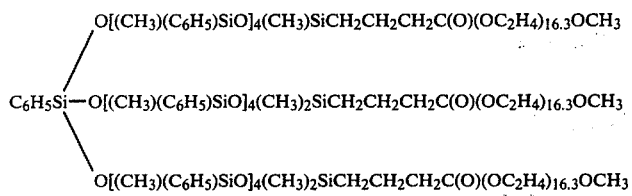

When employing the polysiloxane polyether copolymers of Formula (1) as an aid in improving the flow properties of one-component RTV compounds, the copolymer is generally present in an amount equal to from about 0.25 to about 2.85 parts by weight based on the weight of the organopolysiloxane base polymer and preferably about 1.40 parts by weight of the base polymer.

Various extenders and fillers can be added to the one-component room temperature vulcanizable silicone rubber compositions. Examples of the fillers that can be employed include titanium dioxide, lithopone, zinc oxide, zirconium oxide, aluminum oxide, alpha quartz, colloidal silica, fumed silica, precipitated silica, silica aerogel, calcium carbonate, glass fibers, magnesium oxide, calcined clay, asbestos, carbon, graphite, quartz, cotton, synthetic fibers, and the like. The silica fillers can be treated with cyclicpolysiloxanes and preferably octamethylcyclotetrasiloxane as described in U.S. Pat. No. 2,938,009. The silica fillers treated with silazanes as disclosed in U.S. Pat. No. 3,635,743 are also suitable for use in the one-component room temperature vulcanizable silicone rubber compositions of the present invention. The fillers are generally employed in amounts from about 5 to about 200 parts by weight per 100 parts by weight of the organopolysiloxane base polymer, and preferably, there is utilized from about 1 to about 100 parts by weight of filler per 100 parts of the base polymer.

The one-component silicone rubber compositions can also contain a dialkoxy-diacyloxysilane as an adhesion promoter as disclosed in U.S. Pat. No. 3,296,161 which patent is incorporated herein by reference. The dialkoxy-diacycloxysilane is of the formula:

$$(RO_2)Si(OY)_2 \quad (14)$$

where R is a lower alkyl radical, for example, methyl, ethyl, propyl, butyl, t-butyl, hexyl, octyl, radicals; and Y is a saturated aliphatic monoacyl radical of a carboxylic acid, for example, formyl, acetyl, propionyl and butyryl, radicals. Preferably, R is t-butyl and Y is acetyl. Specific silanes within the scope of Formula (14) include dimethoxydiformoxysilane, diethoxydiformoxysilane, dipropoxydiacetoxysilane, di-t-butoxydiacetoxysilane, di-2-ethylhexoxydioctanoyloxysilane, and the like.

The silanes of Formula (14) are generally prepared by reacting silicon tetrachloride with an anhydride of the acid represented by Y in the formula. In preparing the silanes of Formula (14) wherein Y is acetoxy, silicon tetrachloride is reacted with acetic anhydride to produce silicon tetraacetate. If it is desired to produce a silane of Formula (14) wherein R is t-butyl, the silicon tetraacetate is reacted with t-butyl alcohol to provide such composition.

The relative amounts of the organopolysiloxane base polymer to the dialkoxydiacyloxysilanes of Formula (14) vary within broad limits. Generally, the amount of dialkoxydiacyloxysilane varies from about 0.2 to about 6 parts by weight per 100 parts by weight of the organopolysiloxane base polymer. The dialkoxydiacyloxysilane usually comprises from about 5% to about 70% by weight of the total weight of the organotriacyloxysilane of Formula (2) and the dialkoxydiacyloxysilane.

Additional conventional ingredients can also be included in the one-component silicone rubber compositions, such as flame retardants, stabilizing agents, pigments, and the like.

Where the compositions of the present invention contain ingredients other than the silanol chainstopped diorganopolysiloxane base polymer, and the organotriacyloxysilane cross-linker, these ingredients can be added in any desired manner. It is customary to form a base blend of all the components except the cross-linker, the catalyst and, if present, the adhesion promoter. The base blend is then subjected to a vacuum to remove any moisture present. Thereafter, the cross-linker, the catalyst and, optionally, the adhesion promoter are added to the mixture prior to packaging in containers wherein the mixture is protected from moisture.

EXAMPLE

The following is an example only and should not be construed as limiting the invention. One-component room temperature vulcanizable silicone rubber compositions were prepared by incorporating varying amounts of a polysiloxane polyether copolymer. The flow rate for these varying compositions was determined utilizing a Boeing Flow Jig.

The polysiloxane polyether copolymer employed in these compositions consisted of a polyfunctional carboxyalklsiloxane of low molecular weight and a polyethyleneoxide-polypropyleneoxide copolymer chain-stopped with butoxy groups. The compound had a viscosity of about 730 centipoises at 25° C. and corresponded to the formula:

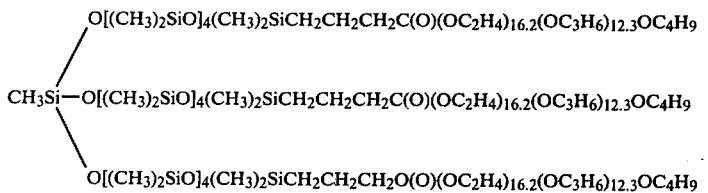

| Percentage of Polysiloxane Polyether Copolymer in the Silicone Rubber | Flow (After 3 Hours) (inches) | Flow (After 3 Days) (inches) |
| --- | --- | --- |
| 0 | 0.4 | 0.35 |
| .13 | 0.6 | 0.7 |
| 0.4 | 0.1 | 0.2 |
| 1.0 | 0.05 | 0.12 |

With regard to the data relating to the silicone rubber composition containing 0.13% of the polysiloxane polyether copolymer, the ineffectiveness of the polysiloxane polyether copolymer may be due to a failure of the copolymer to be incorporated into the silicone rubber composition.

The above-noted test data indicates that as little as 0.4% of the polysiloxane polyether copolymer reduces the flow properties of a one-component room temperature vulcanizable silicone rubber composition. The flow properties of one-component room temperature vulcanizable silicone rubbers have been adjusted and improved in accordance with the present invention.

While the foregoing example has illustrated an embodiment of the invention, it should be understood that The one-component room temperature vulcanizable silicone rubber compositions containing the above-identified polysiloxane polyether copolymer were prepared in the following manner. To 100 parts of a silanol-terminated dimethyl silicone oil (base polymer) having a viscosity of from 2500–3500 centipoises at 25° C. were added 21 parts of a fumed silica filler, Cab-O-Sil MS-70, treated with octamethylcyclotetrasiloxane, and 15.0 parts of a process aid composed of 2.9 mole percent of trimethylsiloxy units, chemically combined with 19.9 mole percent of methylsiloxy units, and 77.2 mole percent of dimethylsiloxy units, having 0.5 percent by weight of hydroxy radicals attached to silicon based on the weight of the process aid.

A Semco kit tube was then utilized to mix 144 grams of the above-identified composition with a specific amount of the polysiloxane polyether copolymer previously mentioned for 10 minutes under anhydrous conditions. The following amounts of the polysiloxane polyether copolymer were added: 0, 0.2 grams, 0.6 grams and 1.5 grams.

To the above mixtures were added and mixed 6 grams of a second mixture consisting of 80 parts of methyltriacetoxysilane cross-linker, 20 parts of an adhesion promoter, di-t-butoxydiacetoxysilane, and 0.60 parts of a catalyst, dibutyl tin dilaurate (Thermolite 12) for 15 minutes.

The final mixtures were allowed to stand for several hours before the flow was determined. The table below shows that the addition of the polysiloxane polyether copolymer to the one-component room temperature vulcanizable silicone rubber compositions resulted in a decrease in the flow properties of such compositions.

other variations and modifications falling within the scope of the appended claims are to be included therein.

What is claimed is:

1. A one-component room temperature vulcanizable silicone rubber composition comprising:
  (a) 100 parts by weight of a silanol end-stopped liquid organopolysiloxane base polymer having a viscosity of from about 200 to about 500,000 centistokes at 25° C., containing an average of from 1.85 to 2.01 organic radicals per silicon atom, and containing from about 0.02% to about 2.0% silicon-bonded hydroxyl radicals;
  (b) from about 1.8 to about 6.0 parts by weight, based upon the weight of the organopolysiloxane, of an organotriacyloxysilane cross-linker having the formula:

where $R^3$ is a radical selected from the group consisting of monovalent hydrocarbon radicals, halogenated monovalent hydrocarbon radicals, and cyanoalkyl radicals, and Y is a saturated monacyl radical of a carboxylic acid; and
  (c) from about 0.25 to about 2.85 parts by weight based upon the weight of the organopolysiloxane base polymer, of a polysiloxane polyether copolymer having the formula:

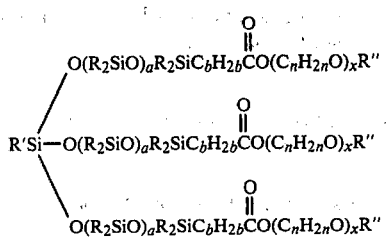

where R and R' are monovalent hydrocarbon radicals, R" is a lower alkyl radical, a has a value of at least 2, b has a value of from 2 to 3, inclusive, n has a value of from 2 to 4, inclusive, and x has a value of at least 5.

2. A composition in accordance with claim 1, wherein the polysiloxane polyether copolymer comprises about 1.40 parts by weight, based upon the weight of the orgaopolysiloxane base polymer.

3. A composition in accordance with claim 1, wherein R and R' are radicals selected from the group consisting of methyl and phenyl.

4. A composition in accordance with claim 1, wherein the polysiloxane polyether copolymer corresponds to the formula:

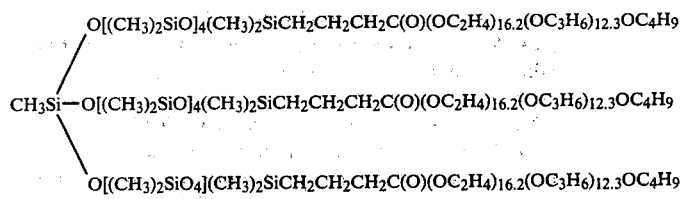

having a viscosity of about 730 centipoises at 25° C.

5. A composition in accordance with claim 1, wherein the silanol end-stopped liquid organopolysiloxane base polymer has the formula:

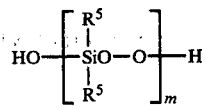

where $R^5$ is a radical selected from the group consisting of monovalent hydrocarbon radicals, halogenated monovalent hydrocarbon radicals and cyanoalkyl radicals, and m has a value of at least 5.

6. A composition in accordance with claim 5, wherein $R^5$ is a radical selected from the group consisting of methyl and phenyl.

7. A composition in accordance with claim 1, wherein $R^3$ is methyl and Y is acetyl.

8. A composition in accordance with claim 1, further comprising from about 2 to about 30 parts by weight, based upon the weight of the organopolysiloxane base polymer, of an organosilicon process aid having a viscosity of up to about 200 centipoises at 25° C. comprising diorganosiloxy units of the formula:

chemically combined with organosiloxy units of the formula:

and triorganosiloxy units of the formula:

wherein said process aid contains from about 0.1% to about 8% by weight of hydroxy radicals attached to silicon, and a ratio of organosiloxy units to diorganosiloxy units of from about 0.11 to about 1.4, inclusive, and a ratio of triorganosiloxy units to diorganosiloxy units of from about 0.02 to about 1, inclusive, and where $R^4$ is a radical selected from the group consisting of monovalent hydrocarbon radicals, halogenated monovalent hydrocarbon radicals and cyanoalkyl radicals.

9. A composition in accordance with claim 8, wherein $R^4$ is methyl.

10. A composition in accordance with claim 1, further comprising from about 0.01 to about 5.0 parts by weight, based upon the weight of the organopolysiloxane base polymer, of a catalyst.

11. A composition according to claim 10, wherein the catalyst is a carboxylic acid salt of a metal ranging from lead to manganese, inclusive, in the electromotive series of metals.

12. A composition according to claim 10, wherein the catalyst is a carboxylic acid salt of tin.

13. A composition according to claim 10, wherein the catalyst is an organometallic ester compound of a metal other than silicon selected from the group consisting of a partially chelated ester of a lower aliphatic alcohol with a β-dicarbonyl compound and a partial hydrolyzate of a partially chelated ester of a lower aliphatic alcohol with a β-dicarbonyl compound which retain at least one hydrocarbonoxy radical or substituted hydrocarbonoxy radical attached to the metal atom through M-O-C linkages, where M is a metal, and wherein the weight ratio of said catalyst to the organotriacyloxysilane cross-linker always is at least 0.5 to 1.

14. A composition according to claim 13, wherein in said organometallic ester, the metal M is selected from the group consisting of lead, tin, zirconium, antimony, iron, cadmium, barium, calcium, titanium, bismuth, manganese, zinc, chromium, cobalt, nickel, aluminum, gallium or germanium.

15. A composition according to claim 13, wherein in said organometallic ester, the metal is titanium.

16. A composition in accordance with claim 1, further comprising from about 5 to about 200 parts by weight, based upon the weight of the organopolysiloxane base polymer, of a filler.

17. A composition according to claim 16, wherein the filler is fumed silica treated with octamethylcyclotetrasiloxane.

18. A composition in accordance with claim 1, further comprising from about 0.2 to about 6 parts by weight, based upon the weight of the organopolysiloxane base polymer, of a dialkoxy-diacyloxysilane adhesion promoter.

19. A process for forming a cured one-component room temperature vulcanizable silicone rubber composition comprising:
(a) admixing under substantially anhydrous conditions 100 parts by weight of a silanol end-stopped liquid organopolysiloxane base polymer having a viscosity of from about 200 to about 500,000 centistokes at 25° C., containing an average of from 1.85 to 2.01 organic radicals per silicon atom, and containing from about 0.02% to about 2.0% silicon-bonded hydroxyl radicals, with from about 0.25 to about 2.85 parts by weight, based upon the weight of the organopolysiloxane base polymer, of a polysiloxane polyether copolymer having the formula:

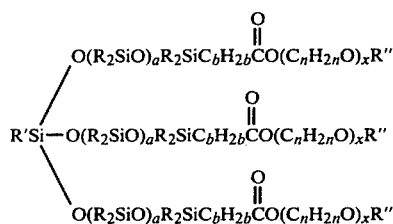

where R and R' are monovalent hydrocarbon radicals, R'' is a lower alkyl radical, a has a value of at least 2, b has a value of from 2 to 3, inclusive, n has a value of from 2 to 4, inclusive, and x has a value of at least 5;
(b) subjecting the mixture to a vacuum to remove moisture;
(c) combining the mixture under substantially anhydrous conditions with from about 1.8 to about 6.0 parts by weight, based upon the weight of the organopolysiloxane base polymer, of an organotriacyloxysilane cross-linker having the formula:

$$R^3Si(OY)_3$$

where $R^3$ is a radical selected from the group consisting of monovalent hydrocarbon radicals, halogenated monovalent hydrocarbon radicals, and cyanoalkyl radicals, and Y is a saturated monoacyl radical of a carboxylic acid; and
(d) exposing the combined mixture to moisture until it cures.

20. A process according to claim 19, wherein about 1.40 parts by weight of the polysiloxane polyether copolymer, based upon the weight of the organopolysiloxane base polymer, is mixed with 100 parts by weight of said organopolysiloxane base polymer.

21. A process according to claim 19, wherein R and R' are radicals selected from the group consisting of methyl and phenyl.

22. A process according to claim 19, wherein the organopolysiloxane is mixed with a polysiloxane polyether copolymer of the formula:

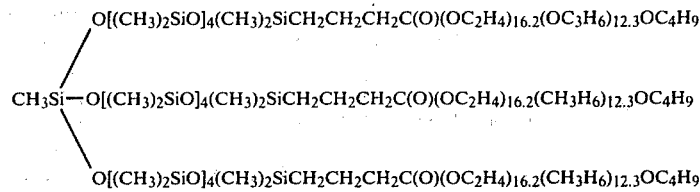

having a viscosity of about 730 centipoises at 25° C.

23. A process according to claim 19, wherein the silanol end-stopped liquid organopolysiloxane base polymer is of the formula:

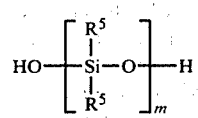

where $R^5$ is a radical selected from the group consisting of monovalent hydrocarbon radicals, halogenated monovalent hydrocarbon radicals and cyanoalkyl radicals, and m has a value of at least 5.

24. A process according to claim 23, wherein $R^5$ is a radical selected from the group consisting of methyl and phenyl.

25. A process according to claim 19, further comprising adding to the silanol end-stopped liquid organopolysiloxane base polymer-polysiloxane polyether copolymer mixture, from about 2 to about 30 parts by weight, based upon the weight of the organopolysiloxane base polymer, of an organosilicon process aid having a viscosity of up to about 200 centipoises at 25° C., said process aid having diorganosiloxy units of the formula:

$$(R^4)_2SiO$$

chemically combined with organosiloxy units of the formula:

$$R^4SiO_{1.5}$$

and triorganosiloxy units of the formula:

$$(R^4)_3SiO_{0.5}$$

said process aid containing from about 0.1% to about 8% by weight of hydroxy radicals attached to silicon, and a ratio of organosiloxy units to diorganosiloxy units of from about 0.11 to about 1.4, inclusive, and a ratio of triorganosiloxy units to diorganosiloxy units of from about 0.02 to about 1, inclusive, and where $R^4$ is a radical selected from the group consisting of monovalent hydrocarbon radicals, halogenated monovalent hydrocarbon radicals and cyanoalkyl radicals.

26. A process according to claim 25, wherein $R^4$ is methyl.

27. A process according to claim 19, further comprising adding from about 0.01 to about 5.0 parts by weight, based upon the weight of the organopolysiloxane base polymer, of a catalyst to the organotriacyloxysilane cross-linker, prior to mixing the organotriacyloxysilane cross-linker with the silanol end-stopped liquid organopolysiloxane base polymer-polysiloxane polyether copolymer mixture.

28. A process according to claim 27, wherein the catalyst comprises a carboxylic acid salt of a metal ranging from lead to manganese, inclusive, in the electromotive series of metals.

29. A process according to claim 27, wherein the catalyst is a carboxylic acid salt of tin.

30. A process according to claim 27, wherein the catalyst comprises an organometallic ester compound of a metal other than silicon selected from the group consisting of a partially chelated ester of a lower aliphatic alcohol with a $\beta$-dicarbonyl compound and a partial hydrolyzate of a partially chelated ester of a lower aliphatic alcohol with a $\beta$-dicarbonyl compound which retain at least one hydrocarbonoxy radical or substituted hydrocarbonoxy radical attached to the metal atom through M-O-C linkages, where M is a metal and wherein the weight ratio of said catalyst to the organotriacyloxysilane cross-linker always is at least 0.5 to 1.

31. A process according to claim 30, wherein in said organometallic ester, the metal M is selected from the group consisting of lead, tin, zirconium, antimony, iron, cadmium, barium, calcium, titanium, bismuth, manganese, zinc, chromium, cobalt, nickel, aluminum, gallium or germanium.

32. A process according to claim 30, wherein in said organometallic ester, the metal M is titanium.

33. A process according to claim 19, further comprising adding to the silanol end-stopped liquid organopolysiloxane base polymer-polysiloxane polyether copolymer mixture, from about 5 to about 200 parts by weight, based upon the weight of the organopolysiloxane base polymer, of a filler.

34. A process according to claim 33, wherein the filler comprises a fumed silica treated with octamethylcyclotetrasiloxane.

35. A process according to claim 19, further comprising adding from about 0.2 to about 6 parts by weight, based upon the weight of the organopolysiloxane base polymer, of a dialkoxy-diacyloxysilane as an adhesion promoter to the organotriacyloxysilane cross-linker, prior to mixing the organotriacyloxysilane cross-linker with the silanol end-stopped liquid organopolysiloxane base polymer-polysiloxane polyether copolymer mixture.

* * * * *